(12) United States Patent
Kwon et al.

(10) Patent No.: US 9,864,230 B2
(45) Date of Patent: Jan. 9, 2018

(54) BACKLIGHT UNIT AND DISPLAY APPARATUS HAVING THE SAME

(71) Applicant: Samsung Display Co., Ltd., Yongin, Gyeonggi-Do (KR)

(72) Inventors: Junghyun Kwon, Seoul (KR); Hyundeok Im, Seoul (KR); Jong Hyuk Kang, Suwon-si (KR); Jae Byung Park, Seoul (KR); Haeil Park, Seoul (KR); Hyun Min Cho, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 361 days.

(21) Appl. No.: 14/601,378

(22) Filed: Jan. 21, 2015

(65) Prior Publication Data

US 2015/0323164 A1 Nov. 12, 2015

(30) Foreign Application Priority Data

May 9, 2014 (KR) ........................ 10-2014-0055579

(51) Int. Cl.
*G02F 1/1335* (2006.01)
*F21V 23/00* (2015.01)
(Continued)

(52) U.S. Cl.
CPC .......... *G02F 1/133603* (2013.01); *F21V 9/16* (2013.01); *F21V 21/14* (2013.01);
(Continued)

(58) Field of Classification Search
CPC .......... F21V 21/14; F21V 23/002; F21V 9/16; G02F 1/133603; G02F 2001/133622;
(Continued)

(56) References Cited

U.S. PATENT DOCUMENTS 6,501,091 B1   12/2002   Bawendi et al.
6,592,780 B2   7/2003    Hohn et al.
(Continued)

FOREIGN PATENT DOCUMENTS

KR   1020100127893 A   12/2010
KR   10-1252089 B1      4/2013
(Continued)

*Primary Examiner* — Tony Davis
(74) *Attorney, Agent, or Firm* — Cantor Colburn LLP

(57) ABSTRACT

A display apparatus includes a display panel that includes a plurality of pixels which displays an image in a front direction, and a backlight unit which provides a light to the display panel and includes a first light source part which is disposed at a rear surface of the display panel, includes a first support substrate and a first light source mounted on the first support substrate and emits a first color light, and a second light source part which is disposed at the rear surface of the display panel, includes a second support substrate partially overlapped with the first support substrate and a second light source mounted on the second support substrate, and emits a second color light having a wavelength band different from that of the first color light, where an opening is defined through the second support substrate and corresponds to the first light source.

20 Claims, 11 Drawing Sheets

(51) Int. Cl.
  *F21V 21/14* (2006.01)
  *F21V 9/16* (2006.01)
  *G09G 3/34* (2006.01)
(52) U.S. Cl.
  CPC ......... *F21V 23/002* (2013.01); *G09G 3/3413* (2013.01); *G02F 2001/133622* (2013.01); *G09G 2300/0452* (2013.01); *G09G 2310/0235* (2013.01)
(58) Field of Classification Search
  CPC ... G09G 2300/0452; G09G 2310/0235; G09G 3/3413
  USPC .......................................................... 345/207
  See application file for complete search history.

(56) References Cited

U.S. PATENT DOCUMENTS

| | | | |
|---|---|---|---|
| 2008/0074902 A1 | 3/2008 | Oh et al. | |
| 2008/0308822 A1* | 12/2008 | Tsang | H01L 25/0753 257/89 |
| 2011/0007047 A1* | 1/2011 | Fujioka | G02F 1/13338 345/207 |
| 2015/0234111 A1* | 8/2015 | Lee | G02B 6/0023 362/608 |

FOREIGN PATENT DOCUMENTS

| | | |
|---|---|---|
| KR | 1020130126396 A | 11/2013 |
| KR | 1020150033437 A | 4/2015 |
| KR | 1020150047402 A | 5/2015 |

\* cited by examiner

< 1-Field >

< 2-Field >

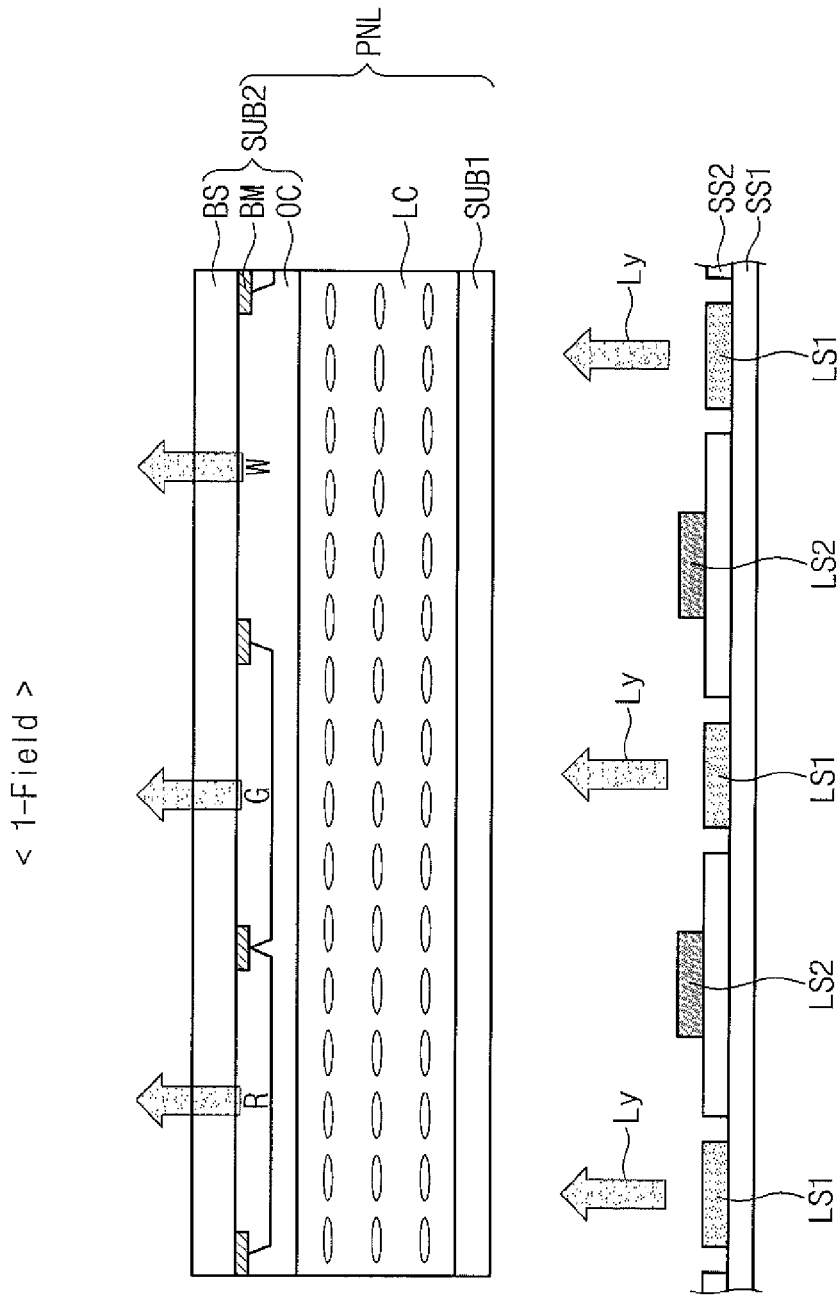

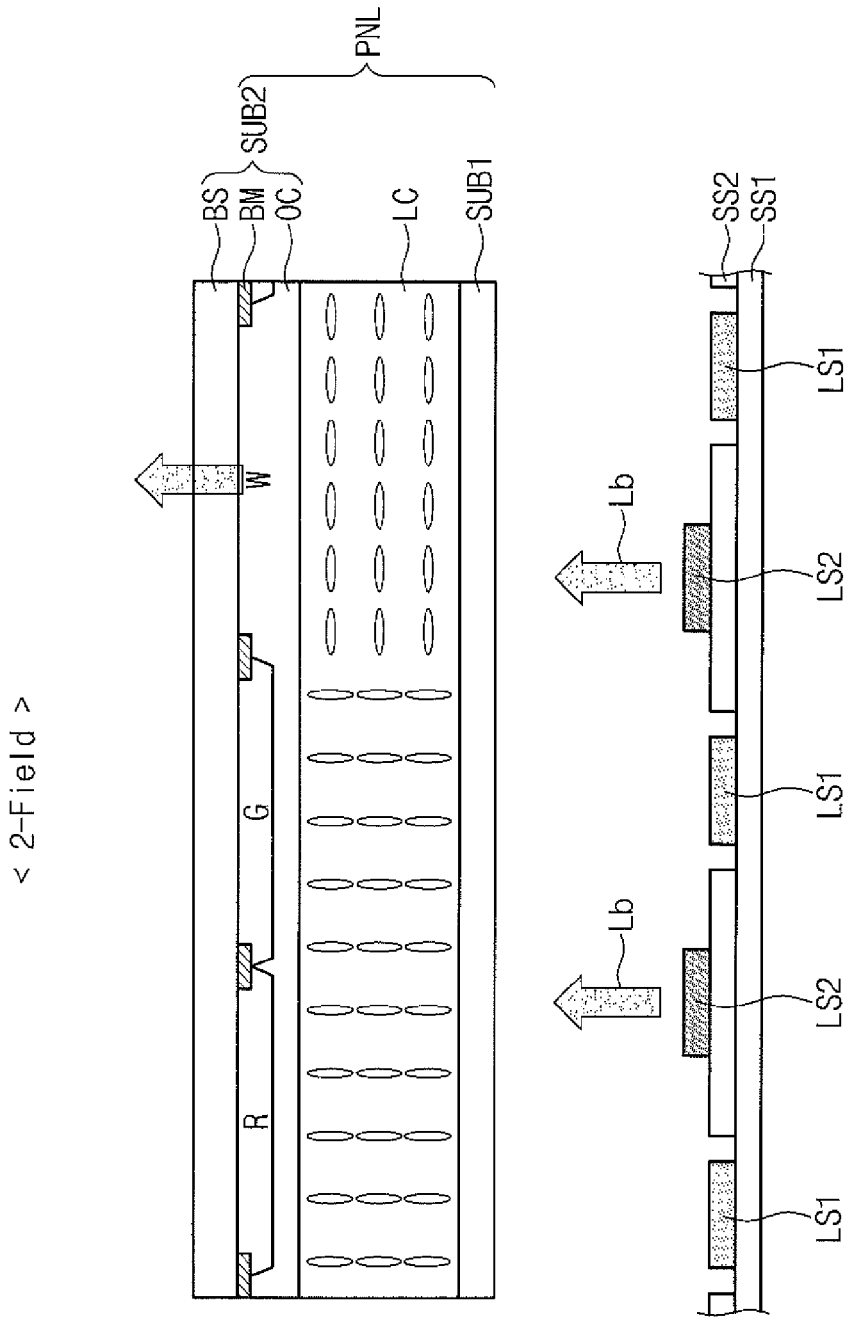

BACKLIGHT UNIT AND DISPLAY APPARATUS HAVING THE SAME

This application claims priority to Korean Patent Application No. 10-2014-0055579, filed on May 9, 2014, and all the benefits accruing therefrom under 35 U.S.C. §119, the contents of which are hereby incorporated by reference in its entirety.

BACKGROUND

1. Field

The invention relates to a backlight unit and a display apparatus having the same. More particularly, the invention relates to a backlight unit and a display apparatus having the backlight unit, which are capable of improving display quality and response speed using a time or space division driving scheme.

2. Description of the Related Art

In general, a display apparatus realizes a full color image using a space division scheme. To this end, a display panel includes red, green, and blue color filters repeatedly arranged to correspond to sub-pixels in a one-to-one correspondence. In this case, a combination of the red, green, and blue color filters serves as a minimum unit to realize a color, and a full color image is realized by a difference in transmittance between the sub-pixels of the display panel and a color combination of the red, green, and blue color filters. As described above, an arrangement in which the red, green, and blue color filters are arranged in different spaces is referred to as the space division scheme.

A time division scheme (or a field sequential scheme), which is able to realize the full color image with high transmittance and low manufacturing costs, is used. In case of the time division scheme, the color filters are omitted from the display panel and a backlight unit disposed at a rear side of the display panel includes red, green, blue light sources respectively emitting red, green, and blue color lights. In addition, a frame is divided into three fields timely separated from each other, and the red, green, and blue light sources are lighted in each field, thereby sequentially displaying red, green, and blue color images. Accordingly, an observer perceives the full color image obtained by combining the red, green, and blue color images by a physiological visual sensation.

SUMMARY

In a display apparatus to which a time division scheme is applied, however, a color breakup phenomenon, in which red, green and blue color images are separately perceived, momentarily occurs when a viewpoint is changed due to a blinking of eyes or a movement of an observer regardless of high transmittance and low manufacturing costs.

The invention provides a backlight unit having advantages of being easy to operate and with low cost.

The invention provides a display apparatus capable of improving display quality and response speed.

The invention provides a display apparatus capable of reducing power consumption and improving color reproducibility.

Exemplary embodiments of the invention provide a display apparatus including a display panel that includes a plurality of pixels to display an image in a front direction and a backlight unit that supplies a light to the display panel. The backlight unit includes a first light source part disposed at a rear surface of the display panel and including a first support substrate and a first light source mounted on the first support substrate to emit a first color light, and a second light source part disposed at a rear surface of the display panel and including a second support substrate partially overlapped with the first support substrate and a second light source mounted on the second support substrate to emit a second color light having a wavelength band different from a wavelength band of the first color light. An opening is defined through the second support substrate to correspond to the first light source, and the first light source is inserted into the opening.

In an exemplary embodiment, the first and second support substrates may include first and second line parts disposed therein, respectively, and at least one of the first and second support substrates is flexible.

In an exemplary embodiment, the first and second light sources may be configured to be each independently driven, the first line part may be configured to apply a power to the first light source, and the second line part may be configured to apply a power to the second light source.

In an exemplary embodiment, the first light source part may further include a support member disposed between the first support substrate and the first light source, and the support member may have a thickness substantially the same as a thickness of the second support substrate.

In an exemplary embodiment, the first light source part may further include a light conversion part disposed on the first light source, and the light conversion part may absorb the first color light emitted from the first light source and convert the first color light to a third color light.

In an exemplary embodiment, each of the pixels may include a first color filter, a second color filter having a color different from the first color filter, and an open portion may be defined in an area which is separated from and adjacent to the first and second color filters, the display panel displays the image in the unit of frame, and the first and second light sources may supply the first and second color lights to the display panel during first and second sub-fields defined by dividing the frame according to a time sequence, respectively.

In an exemplary embodiment, each of the pixels may include a first sub-pixel corresponding to the first color filter, a second sub-pixel corresponding to the second color filter, and a third sub-pixel disposed to correspond to the open portion, and the first to third sub-pixels may be each independently driven.

In an exemplary embodiment, the first to third sub-pixels may receive the first color light during the first sub-field to display the image, and the third sub-pixel receives the second color light during the second sub-field to display the image. The first color light may be a yellow color light and the second color light is a blue color light. The first and second color filters may include a red color filter having a red color and a green color filter having a green color, respectively.

According to the above, the backlight unit may independently drive the light sources having different wavelength bands from each other.

In addition, since the display apparatus realizes the full color image using the time and space division schemes, the display quality and the response speed of the display apparatus may be improved.

Further, the power consumption of the display apparatus may be reduced and the color reproducibility of the display apparatus may be improved.

BRIEF DESCRIPTION OF THE DRAWINGS

The above and other advantages of the invention will become readily apparent by reference to the following detailed description when considered in conjunction with the accompanying drawings, in which:

FIG. 10A is a cross-sectional view taken along line III-III' shown in FIG. 9A; and FIG. 10B is a cross-sectional view taken along line IV-IV' shown in FIG. 9B.

DETAILED DESCRIPTION

Figure 1:
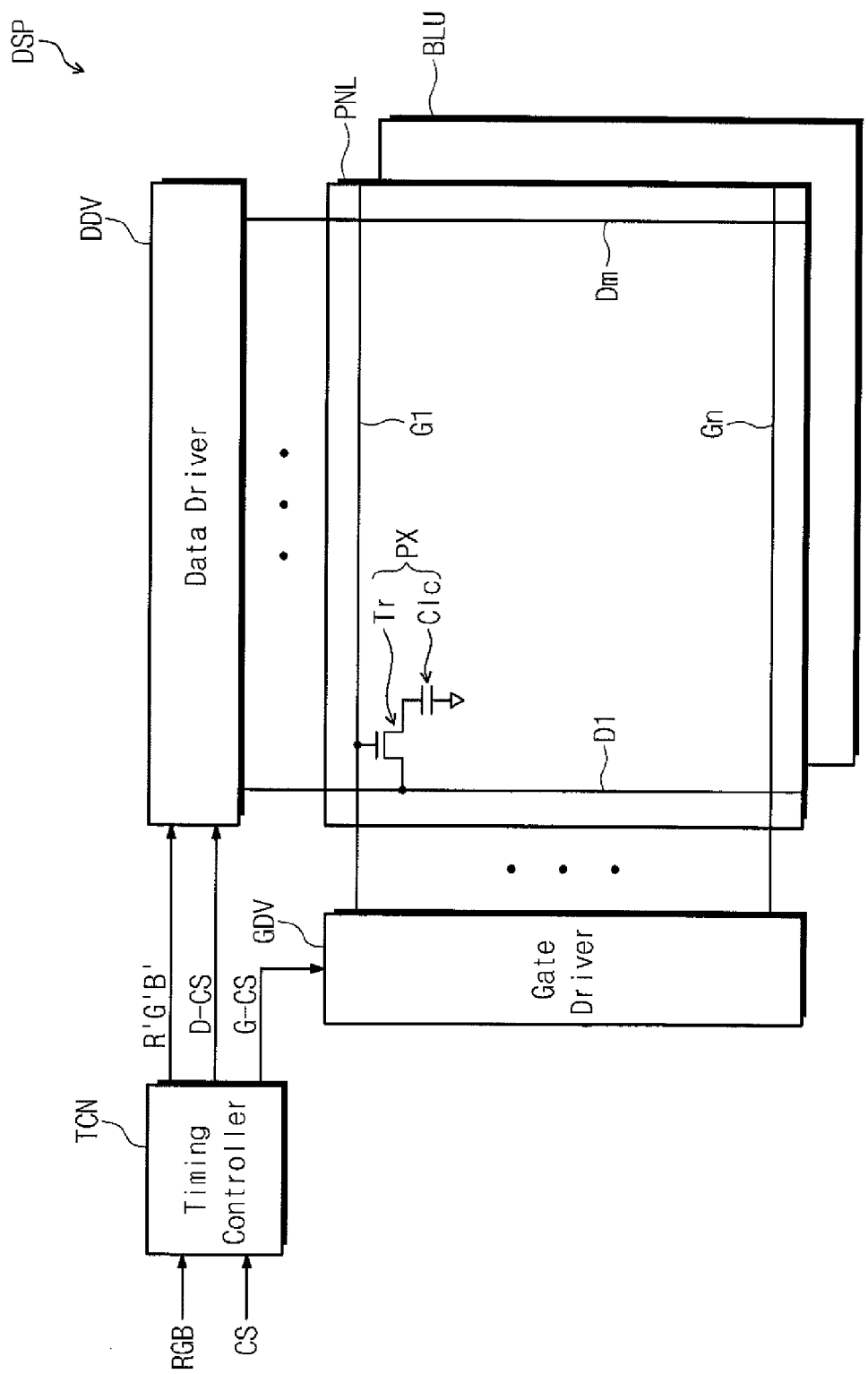
FIG. 1 is a block diagram showing an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In an exemplary embodiment, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a block diagram showing a display apparatus according to an exemplary embodiment of the invention.

Referring to FIG. 1, a display apparatus DSP includes a display panel PNL to display an image, gate and data drivers GDV and DDV to drive the display panel PNL, a timing controller TCN to control a drive of the gate and data drivers GDV and DDV, and a backlight unit BLU disposed at a rear side of the display panel PNL.

In the illustrated exemplary embodiment, the display panel PNL is not a self-emissive display panel, e.g., a liquid crystal display panel, but it should not be limited to the liquid crystal display panel. That is, in other exemplary embodiment, the display panel PNL may include an electrophoretic display panel, an electrowetting display panel, or a microelectromechanical system ("MEMS") display panel, for example. In the illustrated exemplary embodiment, the liquid crystal display panel will be described as the display panel PNL.

The display panel PNL includes a plurality of gate lines G1 to Gn, a plurality of data lines D1 to Dm, and a plurality of pixels PX. The gate lines G1 to Gn extend in a row direction and are arranged in a column direction and substantially parallel to each other. The data lines D1 to Dm extend in the column direction and are arranged in the row direction and substantially parallel to each other.

Each pixel PX includes a thin film transistor ("TFT") and a liquid crystal capacitor. In an exemplary embodiment, the pixel connected to a first gate line G1 and a first data line D1 includes the TFT Tr and the liquid crystal capacitor Clc.

The TFT Tr includes a gate electrode connected to the first gate line G1, a source electrode connected to the first data line D1, and a drain electrode connected to the liquid crystal capacitor Clc.

The timing controller TCN receives image signals RGB and control signals CS from the outside of the display apparatus DSP. The timing controller TCN converts a data format of the image signal RGB appropriate to an interface between the data driver DDV and the timing controller TCN and applies the converted image signals R'G'B' to the data driver DDV. In addition, the timing controller TCN generates a data control signal D-CS, e.g., an output start signal, a horizontal start signal, etc., and a gate control signal G-CS, e.g., a vertical start signal, a vertical clock signal, a vertical clock bar signal, etc., on the basis of the control signals CS. The data control signal D-CS is applied to the data driver DDV and the gate control signal G-CS is applied to the gate driver GDV.

The gate driver GDV sequentially outputs gate signals in response to the gate control signal G-CS provided from the timing controller TCN. Accordingly, the pixels PX are sequentially scanned by the gate signals in a unit of a row.

The data driver DDV converts the converted image signals R'G'B' to data voltages in response to the data control signal D-CS. The data voltages are applied to the display panel PNL.

Thus, each pixel PX is turned on by the gate signal, and the turned-on pixel PX displays the image having a desired gray scale using a corresponding data voltage of the data voltages provided from the data driver DDV.

The backlight unit BLU disposed at the rear side of the display panel PNL supplies a light to the display panel PNL.

Figure 2:
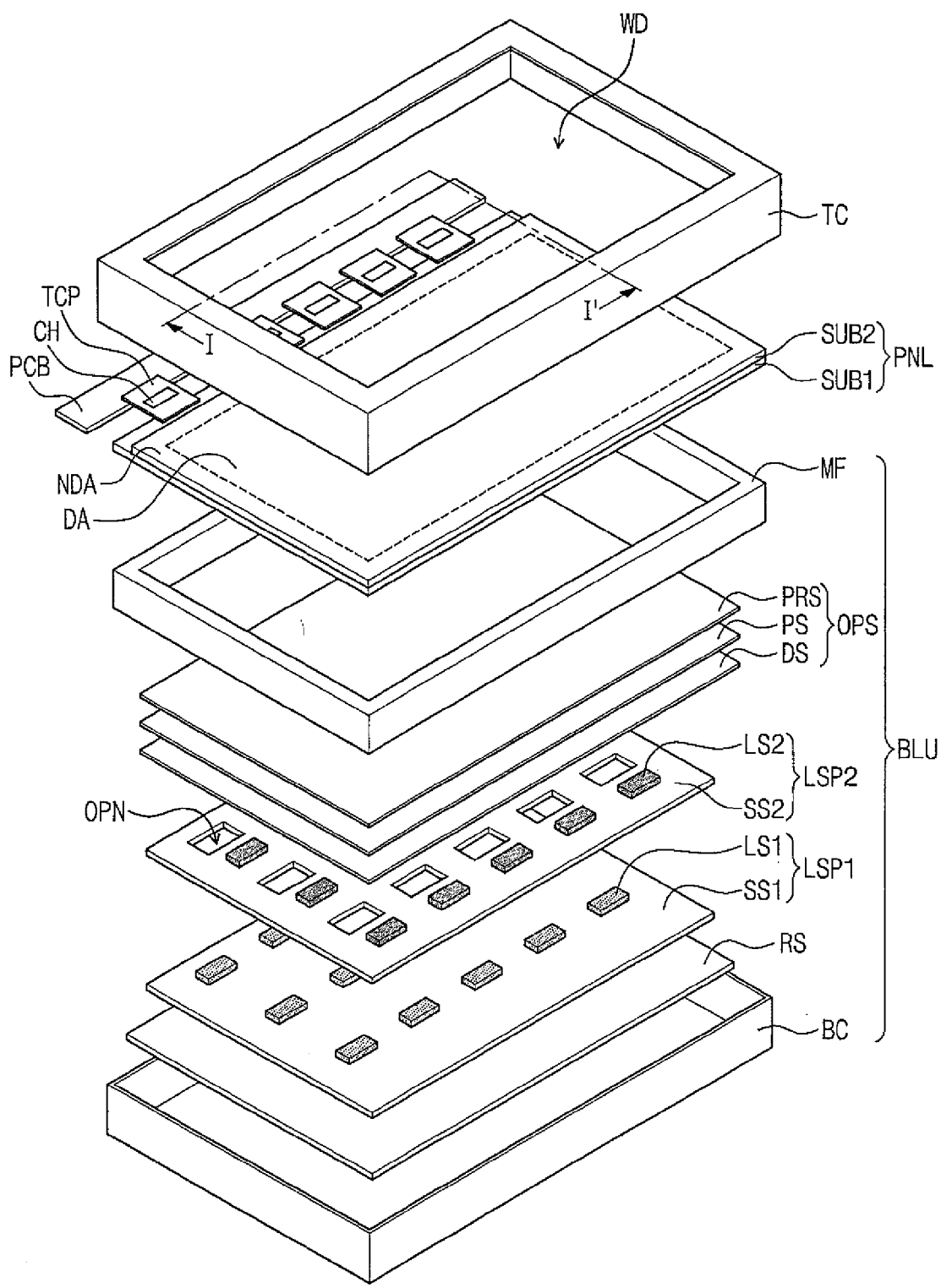
FIG. 2 is an exploded perspective view showing an exemplary embodiment of a display apparatus according to the invention.
Figure 3:
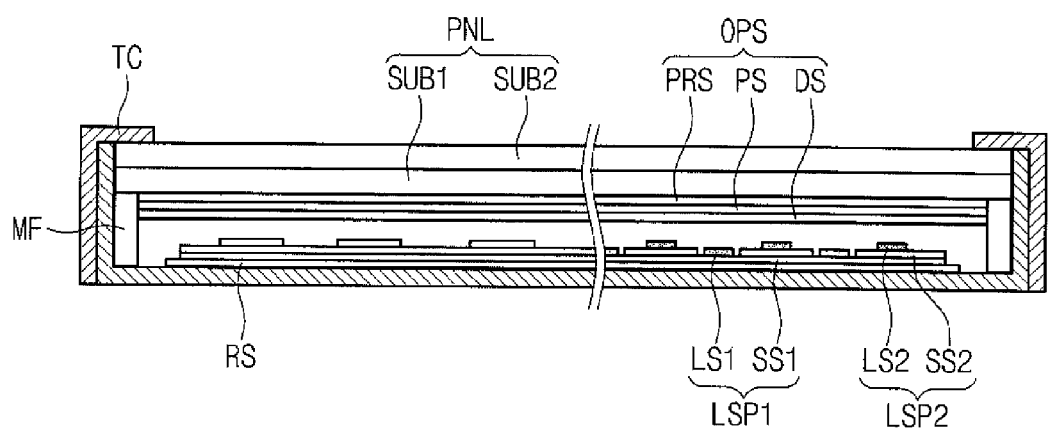
FIG. 3 is a cross-sectional view taken along line I-I' shown in FIG. 1.

FIG. 2 is an exploded perspective view showing a display apparatus according to an exemplary embodiment of the invention and FIG. 3 is a cross-sectional view taken along line I-I' shown in FIG. 2.

Referring to FIGS. 2 and 3, the display apparatus includes the display panel PNL, the backlight unit BLU, and a top chassis TC. For the convenience of explanation, a direction to which the image is provided on the display apparatus is referred to as an upper direction and a direction opposite to the upper direction is referred to as a lower direction, but they should not be limited thereto or thereby.

The display panel PNL displays the image in a front direction. A front surface of the display panel PNL is directed to the upper direction and a rear surface of the display panel PNL is directed to the lower direction. In the illustrated exemplary embodiment, the display panel PNL has a rectangular plate shape in a plan view with two pairs of sides meeting at right angles, and one of the two pairs of sides is longer than the other. In detail, the display panel PNL has the rectangular plate shape in a plan view with a pair of long sides and a pair of short sides. However, the invention is not limited thereto, and the display panel PNL may have various other shapes in a plan view. The display panel DP includes a first substrate SUB1, a second substrate SUB2 facing the first substrate SUB1, and a liquid crystal layer (not shown) interposed between the first substrate SUB1 and the second substrate SUB2. The display panel PNL includes a display area DA in which the image is displayed and a non-display area NDA surrounding the display area DA, in which no image is displayed when viewed in a plan view.

According to the illustrated exemplary embodiment, the first substrate SUB1 includes a plurality of pixel electrodes (not shown) and a plurality of TFTs (not shown) electrically connected to the pixel electrodes in a one-to-one correspondence. Each TFT switches a driving signal applied to the corresponding pixel electrode. In addition, the second substrate SUB2 includes a common electrode (not shown) that generates an electric field in cooperation with the pixel electrodes to control an arrangement of liquid crystal molecules of the liquid crystal layer. The display panel PNL drives the liquid crystal layer LC to display the image to the front direction.

The display panel PNL includes a driving chip CH to generate a driving chip, a tape carrier package TCP, on which the driving chip CH is mounted, and a printed circuit board PCB electrically connected to the display panel PNL through the tape carrier package TCP. The printed circuit board PCB may be placed at various positions. In an exemplary embodiment, the printed circuit board PCB is disposed at the same horizontal plane as that of the display panel PNL in FIG. 2, for example, but it should not be limited thereto or thereby. In another exemplary embodiment, the printed circuit board PCB may be disposed on an outer surface of a bottom chassis BC, for example, which will be described later, as shown in FIG. 3. In this case, the tape carrier package TCP is bent along the outer surface of the bottom chassis BC, and thus the display panel PNL is connected to the printed circuit board PCB. The driving chip CH generates the driving signal in response to an external signal to drive the display panel PNL. In an exemplary embodiment, the external signal is provided from the printed circuit board PCB and includes an image signal, control signals, and a driving voltage signal, for example.

The backlight unit BLU is disposed under the display panel PNL to supply the light to the display panel PNL. The backlight unit BLU includes a mold frame MF supporting the display panel PNL, a light source part including first and second light source parts LSP1 and LSP2 each including light sources emitting the light, optical sheets OPS improving the efficiency of the light, a reflective sheet RS changing a direction in which the light travels, and the bottom chassis BC accommodating the display panel PNL, the mold frame MF, the light source part, the optical sheets OPS, and the reflective sheet RS.

The mold frame MF is provided along the edge of the display panel PNL and disposed under the display panel PNL to support the display panel PNL. In an exemplary embodiment, the mold frame MF may include a fixing member, e.g., a catching jaw, to fix or support the light source part and the optical sheets OPS. The mold frame MF is provided to correspond to four sides of the display panel PNL or at least a portion of the four sides. In an exemplary embodiment, the mold frame MF has a rectangular ring shape to correspond to the four sides of the display panel PNL or a laid-U shape to correspond to three sides of the display panel PNL in a plan view. The mold frame MF may be provided as a single unitary and individual unit, or provided as plural parts. In an exemplary embodiment, the mold frame MF includes an organic material, e.g., polymer resin, but it should not be limited thereto or thereby.

The light source part supplies the light to the display panel PNL and includes first and second light source parts LSP1 and LSP2. The first light source part LSP1 includes a first support substrate SS1 and a first light source LS1 mounted on the first support substrate SS1. The second light source part LSP2 includes a second support substrate SS2 and a second light source LS2 mounted on the second support substrate SS2. In the illustrated exemplary embodiment, each of the first and second light sources LS1 and LS2 is provided in a plural number.

The first and second light sources LS1 and LS2 are each independently and individually driven. That is, each first light source LS1 may be turned on or off separately from another first light source LS1 or the second light source LS2, and each second light source LS2 may be turned on or off separately from another second light source LS2 or the first light source LS1. In an exemplary embodiment, each first light source LS1 and each second light source LS2 may include, but not limited to, a point light source, e.g., a light emitting diode. The light emitted from the first and second light sources LS1 and LS2 travels in various directions. In an exemplary embodiment, the first and second light sources LS1 and LS2 may include an upward surface emission light source, but they should not be limited to the upward surface emission light source. That is, in another exemplary embodiment, the first and second light sources LS1 and LS2 may include a side surface emission light source.

The first and second light source parts LSP1 and LSP2 will be described in detail later.

Although not shown in figures, in an exemplary embodiment, a light source part control unit may be connected to the first and second light source parts LSP1 and LSP2. The light source part control unit is connected to the first and second light sources LS1 and LS2, and analyzes the image displayed through the display panel PNL to generate a local dimming signal. In an exemplary embodiment, the first and second light sources LS1 and LS2 are individually controlled in response to the local dimming signal, for example. In an exemplary embodiment, the light source part control unit may be mounted on a separate printed circuit board, but it should not be limited thereto or thereby. That is, in another exemplary embodiment, the light source part control unit may be disposed on the first support substrate SS1 and/or the second support substrate SS2.

The optical sheets OPS are disposed between the light source part and the display panel PNL. The optical sheets OPS control the light emitted from the light source part. In the illustrated exemplary embodiment, the optical sheets OPS includes a diffusion sheet DS, a prism sheet PS, and a protective sheet PRS, which are sequentially stacked on the light source part.

The diffusion sheet DS diffuses the light. The prism sheet PS condenses the light diffused by the diffusion sheet DS to allow the light exiting from the diffusion sheet DS to travel in a direction substantially vertical to the display panel PNL. The light exiting from the prism sheet PS is vertically incident into the display panel PNL. The protective sheet PRS is disposed on the prism sheet PS to protect the prism sheet PS from external impacts. In the illustrated exemplary embodiment, the optical sheets OPS are configured to include one diffusion sheet DS, one prism sheet PS, and one protective sheet PRS, but they should not be limited thereto or thereby. That is, in another exemplary embodiment, at least one of the diffusion sheet DS, the prism sheet PS, and the protective sheet PRS of the optical sheets OPS may be provided in plural number, or one or more of the diffusion sheet DS, the prism sheet PS, and the protective sheet PRS may be omitted from the optical sheets OPS. In an exemplary embodiment, the stack order of the diffusion sheet DS, the prism sheet PS, and the protective sheet PRS may be changed.

The reflective sheet RS is disposed under the light source part to reflect the light leaked from the light source part without being directed to the display panel PNL to allow the light leaked from the light source part to travel to the display panel PNL. The reflective sheet RS is disposed on the bottom chassis BC to reflect the light. As a result, the amount of the light traveling to the display panel PNL is increased by the reflective sheet RS. The reflective sheet RS may be omitted depending on the size of the first and second support substrates SS1 and SS2 of the first and second light source parts LSP1 and LSP2. In an exemplary embodiment, when the first and second support substrates SS1 and SS2 cover the whole display area DA, the reflective sheet RS may be omitted.

Among elements of the backlight unit BLU, the bottom chassis BC is disposed at a lowermost position to accommodate the display panel PNL, the mold frame MF, the light source part, the optical sheets OPS, and the reflective sheet RS.

The top chassis TC is disposed on the display panel PNL. The top chassis TC supports a front end portion of the display panel PNL and covers a side portion of the mold frame MF or a side portion of the bottom chassis BC. A display window WD is defined through the top chassis TC to expose an area of the display panel PNL, in which the image is displayed.

Hereinafter, the first and second light source parts LSP1 and LSP2 of the backlight unit BLU will be described in detail.

Figure 4A:
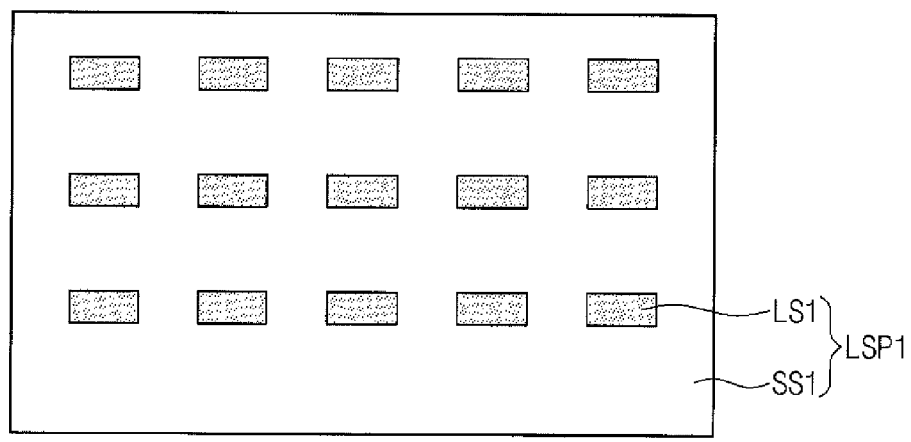
FIG. 4A is a plan view showing an exemplary embodiment of a first light source part of a display apparatus according to the invention.
Figure 4B:
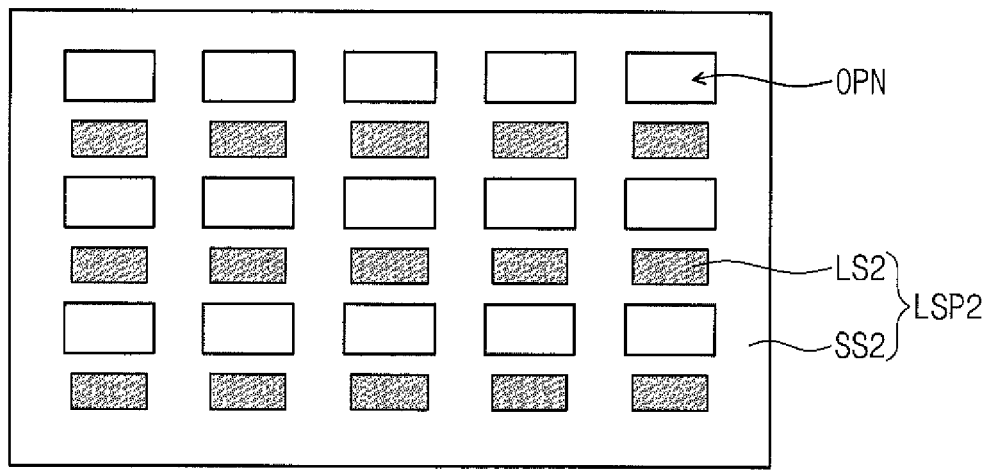
FIG. 4B is a plan view showing an exemplary embodiment of a second light source part of a display apparatus according to the invention.
Figure 4C:
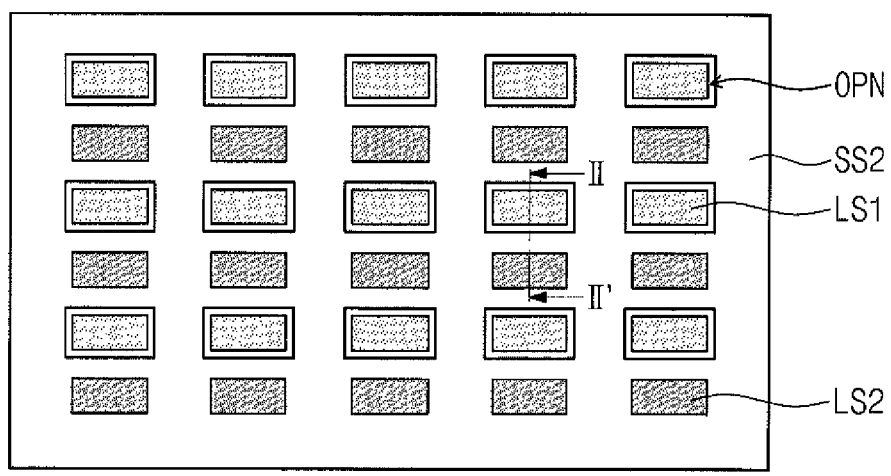
FIG. 4C is a cross-sectional view showing an exemplary embodiment of the first and second light source parts assembled to each other of a display apparatus according to the invention.
Figure 5:
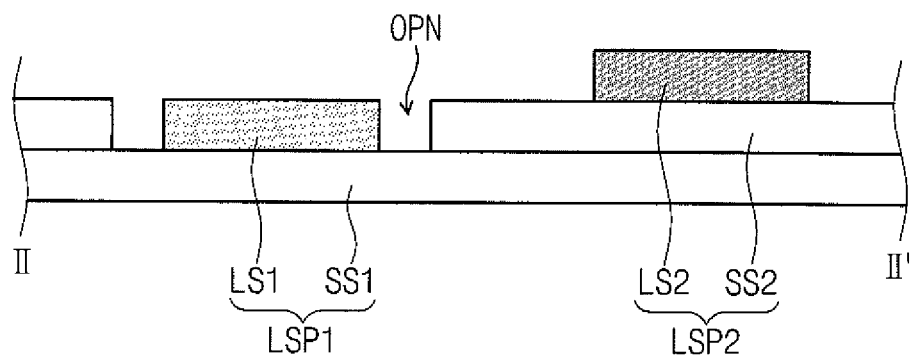
FIG. 5 is a cross-sectional view taken along line II-II' shown in FIG. 4C.

FIG. 4A is a plan view showing a first light source part of a display apparatus according to an exemplary embodiment of the invention, FIG. 4B is a plan view showing a second light source part of a display apparatus according to an exemplary embodiment of the invention, FIG. 4C is a cross-sectional view showing the first and second light source parts assembled to each other of a display apparatus according to an exemplary embodiment of the invention, and FIG. 5 is a cross-sectional view taken along line II-II' shown in FIG. 4C.

Referring to FIGS. 2, 3, and 4A, the first light source part LSP1 includes the first support substrate SS1 and the first light sources LS1 mounted on the first support substrate SS1.

The first light sources LS1 emit a first color light.

The first light sources LS1 are disposed to face the rear surface of the display panel PNL and overlapped with the display area DA of the display panel PNL when viewed in a plan view. The first light sources LS1 are arranged to be spaced apart from each other at a predetermined distance, and thus the first light sources LS1 uniformly emit the light to the display area DA of the display panel PNL. In an exemplary embodiment, the number of the first light sources LS1 and the distance between the first light sources LS1 may be determined depending on a size of the display panel PNL, and a position, a kind, and characteristics of the first light sources LS1.

The first support substrate SS1 may be, but not limited to, a printed circuit board in which a line part (not shown) is provided. In an exemplary embodiment, the first support substrate SS1 may have flexibility. When the line part of the first support substrate SS1 is referred to as a first line part, the first line part may be a power supply line connected to each of the first light sources LS1 to apply a power to each of the first light sources LS1. As described above, when the power is independently applied to each of the first light sources LS1 through the first line part, the turn on and off of the first light source LS1 may be individually controlled.

The first support substrate SS1 is overlapped with at least a portion of the display area DA of the display panel PNL when viewed in a plan view. In the illustrated exemplary embodiment, the first support substrate SS1 may cover the whole of the display area DA of the display panel PNL when viewed in a plan view.

Referring to FIGS. 2, 3, and 4B, the second light source part LSP2 includes the second support substrate SS2 and the second light sources LS2 mounted on the second support substrate SS2.

In an exemplary embodiment, the second light sources LS2 emit a second color light having a wavelength band different from that of the first color light. In the illustrated exemplary embodiment, the first and second color lights may be yellow and blue color lights, respectively, for example. According to another embodiment, the first color light may be the blue color light and the second color light may be the yellow color light, but the first and second color lights should not be limited thereto or thereby.

The second light sources LS2 are disposed to face the rear surface of the display panel PNL and overlapped with the display area DA of the display panel PNL when viewed in a plan view. The second light sources LS2 are arranged to be spaced apart from each other at a predetermined distance, and thus the second light sources LS2 uniformly emit the light to the display area DA of the display panel PNL. The number of the second light sources LS2 and the distance between the second light sources LS2 are determined depending on the size of the display panel PNL, and the position, the kind, and the characteristics of the second light sources LS2. In the illustrated exemplary embodiment, the number of the first light sources LS1 may be equal to the number of the second light sources LS2 such that the first light sources LS1 correspond to the second light sources LS2 in a one-to-one correspondence. In the illustrated exemplary embodiment, the first and second light sources LS1 and LS2, which correspond to each other, are disposed adjacent to each other. However, the number of the first and second light sources LS1 and LS2 should not be limited thereto or thereby. That is, in another exemplary embodiment, the number of the first light sources LS1 may be different from the number of the second light sources LS2.

The second support substrate SS2 may be, but not limited to, a printed circuit board in which a line part (not shown) is provided. The second support substrate SS2 may have flexibility. When the line part of the second support substrate SS2 is referred to as a second line part, the second line part may be a power supply line connected to each of the second light sources LS2 to apply a power to each of the second light sources LS2. As described above, when the power is independently applied to each of the second light sources LS2 through the second line part, the turn on and off of the second light source LS2 may be individually controlled.

The second support substrate SS2 includes openings OPN defined therethrough to respectively correspond to the first light sources LS1 when viewed in a plan view. The number and shape of the openings OPN correspond to the number and shape of the first light sources LS1, respectively. In the exemplary embodiment, the openings OPN have a size greater than that of the first light sources LS1 when viewed in a plan view, but the openings OPN may have the same size as that of the first light sources LS1 according to embodiments.

The second support substrate SS2 is overlapped with at least a portion of the display area DA of the display panel PNL when viewed in a plan view. In the illustrated exemplary embodiment, the second support substrate SS2 may cover the whole of the display area DA of the display panel PNL when viewed in a plan view.

Referring to FIGS. 2, 3, and 4C, when the first light source part LSP1 and the second light source part LSP2 are assembled to each other, the second light source part LSP2 is disposed on the first light source part LSP1.

The first light sources LS1 are inserted into the openings OPN, and thus the first light sources LS1 face the rear surface of the display panel PNL.

The second support substrate SS2 is overlapped with at least a portion of the first support substrate SS1 when viewed in a plan view. An upper surface of the first support substrate SS1 makes contact with a lower surface of the second support substrate SS2. In the illustrated exemplary embodiment, the second support substrate SS2 is overlapped with the whole area of the first support substrate SS1 when viewed in a plan view. However, the first and second support substrates SS1 and SS2 may have different sizes from each other, but they should not be limited thereto or thereby as long as the first and second light sources LS1 and LS2 are arranged to correspond to the display panel PNL.

Although not shown in figures, in an exemplary embodiment, a light reflection layer may be disposed on at least the second support substrate SS2 and reflects the first and second color lights emitted from the first and second light sources LS1 and LS2 to allow the first and second color lights to travel to the display panel PNL.

Although not shown in figures, in an exemplary embodiment, a connector may be provided at one side portion of the first and second support substrates SS1 and SS2 and connected to the light source part control unit. In this case, an additional opening may be defined through the second support substrate SS2 to withdraw the connector between the first and second support substrates SS1 and SS2 to the outside of the second support substrate SS2.

The light source part having the above-mentioned structure may individually drive the light sources having different wavelength bands from each other at lower cost.

In contrast, a conventional display apparatus includes a single support substrate. When a light source part includes the support substrate having a line part with a signal-layer structure, the same power supply line disposed on the single layer is used to apply the power. In this case, the light sources that emit different color lights from each other are difficult to be individually driven. Accordingly, a duty ratio control process of each pixel of the conventional display apparatus is performed to control an amount of the light emitted from the light sources. As a result, color reproducibility is lowered due to increase of the duty ratio. Further, when an amount of a current applied to each light source is controlled in order to prevent the color reproducibility from lowering, a power consumption of the display apparatus is increased.

In addition, when the line part of the support substrate of the conventional display apparatus has a double-layer structure, the structure of the line part becomes complex and large-sized. Accordingly, the line part of the support substrate and the bottom chassis may be shorted with each other, and the cost of the support substrate becomes high.

However, since the light source part according to the illustrated exemplary embodiment includes the support substrates each including the line part having the single-layer structure, the cost of the display apparatus becomes low, the light source parts are easily assembled to each other, and the light sources that emit different color lights are individually driven.

Figure 6:
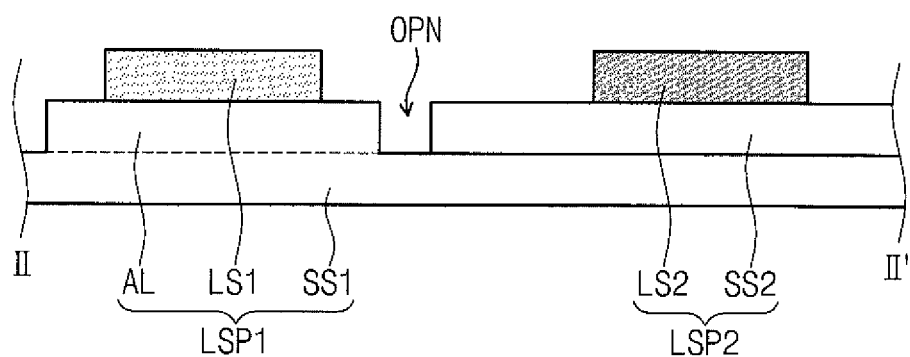
FIG. 6 is a cross-sectional view showing an exemplary embodiment of first and second light source parts assembled to each other of a display apparatus according to the invention.
Figure 7:
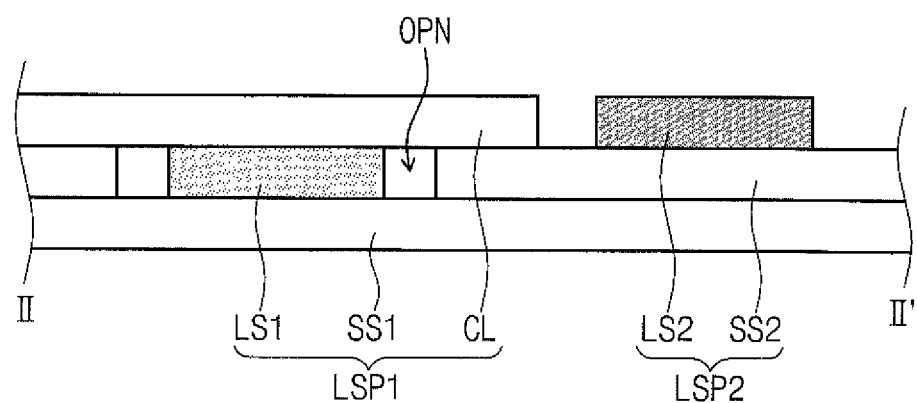
FIG. 7 is a cross-sectional view showing an exemplary embodiment of first and second light source parts assembled to each other of a display apparatus according to the invention.

FIG. 6 is a cross-sectional view showing the first and second light source parts assembled to each other of the display apparatus according to an exemplary embodiment of the invention and FIG. 7 is a cross-sectional view showing the first and second light source parts assembled to each other of the display apparatus according to an exemplary embodiment of the invention.

Referring to FIG. 6, a first light source part LSP1 includes a first light source LS1, a first support substrate SS1 on which the first light source LS1 is mounted, and a support member AL disposed between the first light source LS1 and the first support substrate SS1.

Due to the support member AL, a distance between the display panel PNL (refer to FIG. 2) and the first light source LS1 becomes substantially equal to a distance between the display panel PNL and the second light source LS2. This is to prevent the amount of the light supplied to the display panel PNL from the first light source LS1 from being different from the amount of the light supplied to the display panel PNL from the second light source LS2 when the distance between the display panel PNL and the first light source LS1 is different from the distance between the display panel PNL and the second light source LS2. To this end, the support member AL has substantially the same thickness as that of the second support substrate SS2, but the thickness of the support member AL should not be limited to the thickness of the second support substrate SS2. That is, in another exemplary embodiment, the thickness of the support member AL may be changed depending on the amount, color, and traveling direction of the lights emitted from the first and second light sources LS1 and LS2.

In an exemplary embodiment, the support member AL includes the same material as the first support substrate SS1 and includes a connection line (not shown) that connects the first support substrate SS1 and the first light source LS1. In the illustrated exemplary embodiment, the support member AL may be unitary with the first support substrate SS1.

Referring to FIG. 7, a first light source part LSP1 includes a first light source LS1, a first support substrate SS1 on which the first light source LS1 is mounted, and a light conversion part CL that converts the light emitted from the first light source LS1.

The light conversion part CL is disposed on the first light source LS1. The light conversion part CL absorbs the first color light emitted from the first light source LS1 and converts the first color light to a third color light having a wavelength band different from that of the first color light. In an exemplary embodiment, the light conversion part CL may be a fluorescent substance or a quantum dot, which absorbs the first color light and converts the first color light to the third color light. In the illustrated exemplary embodiment, the first color light has a wavelength shorter than that of the third color light. The color of the third color light is determined depending on the kind of the fluorescent substance and the quantum dot. In the illustrated exemplary embodiment, one of the first and third color lights is the blue color light and the other of the first and third color lights is the yellow color light.

In the illustrated exemplary embodiment, the first light source LS1 is farther spaced apart from the display panel by the second support substrate SS2 than the second light source LS2. Therefore, the light conversion part CL is provided in the area corresponding to the distance difference.

As described above, the display apparatus may realize the full color image using the time and space division schemes.

Figure 8:
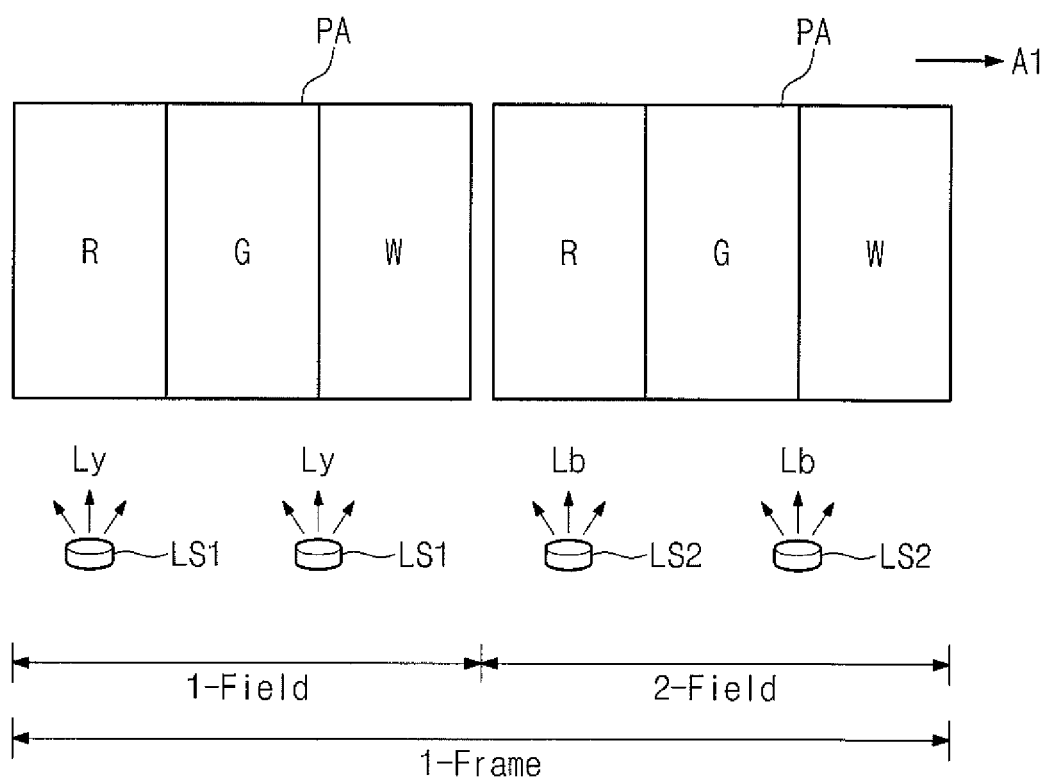
FIG. 8 is a view showing a principle of realizing a full color image using time and space division schemes.

FIG. 8 is a view showing a principle of realizing a full color image using time and space division schemes.

Referring to FIG. 8, the display panel PNL (refer to FIG. 1), to which the time and space division schemes are applied, includes first and second color filters having different colors from each other. In an exemplary embodiment, the first and second color filters include a red color filter R to produce a red color and a green color filter G to produce a green color, for example. When an area corresponding to one pixel is referred to as a pixel area PA, each pixel area PA includes the red and green color filters R and G In addition, an open portion W in which the first and second color filters R and G are not disposed is provided in each pixel area PA. The open portion W is disposed adjacent to a side of one of the red and green color filters R and G The red color filter R, the green color filter G, and the open portion W are arranged in a direction A1, but it need not be limited to the direction A1. In another exemplary embodiment, the color filters R and G and open portion W may be arranged in other directions.

As mentioned above, the time and space division schemes are applied to the display panel PNL of FIG. 1, which includes the backlight unit BLU. Referring to FIG. 2, the backlight unit BLU includes a first light source LS1 emitting a first color light Ly and a second light source LS2 emitting a second color light Lb. A frame 1-Frame is divided into two sub-fields, e.g., a first sub-field 1-Field and a second sub-field 2-Field, according to a time sequence. In the first field 1-Field, the first light source LS1 is driven and the first color light Ly exits from the backlight unit BLU, thereby supplying the first color light Ly to the display panel PNL. Then, in the second field 2-Field, the second light source LS2 is driven and the second color light Lb exits from the backlight unit BLU, thereby supplying the second color light Lb to the display panel PNL.

In the illustrated exemplary embodiment, the first color light Ly may be a yellow color light and the second color light Lb may be a blue color light, for example. When the first color light Ly perceived by a user is the yellow color light, the first color light Ly includes lights having wavelength bands corresponding to red and green light components. That is, the first color light Ly may have the wavelength band corresponding to the red color light and the wavelength band corresponding to the green color light. The term of "wavelength band of the lights" used herein means a range from a shortest wavelength to a longest wavelength when each light has a predetermined area corresponding to about 90 percent (%) of a total intensity thereof with a peak as its center in a normalized spectrum.

Therefore, the red light component of the first color light Ly generated from the backlight unit BLU passes through the first color filter R and is displayed as a red image during the first sub-field 1-Field, and the green light component of the first color light Ly passes through the second color filter G and is displayed as a green image during the first sub-field 1-Field.

During the second sub-field 2-Field, the second color light Lb generated from the backlight unit BLU passes through the open portion W and is displayed as a blue image.

As described above, the open portion W provides spaces in which the blue image is displayed during the second sub-fields 2-Field. In addition, the open portion W prevents the color breakup phenomenon from occurring in the time division scheme and enhances brightness. Further, the size of the open portion W is determined to have a transmittance appropriate to desired brightness or desired color of the frame.

Figure 9A:
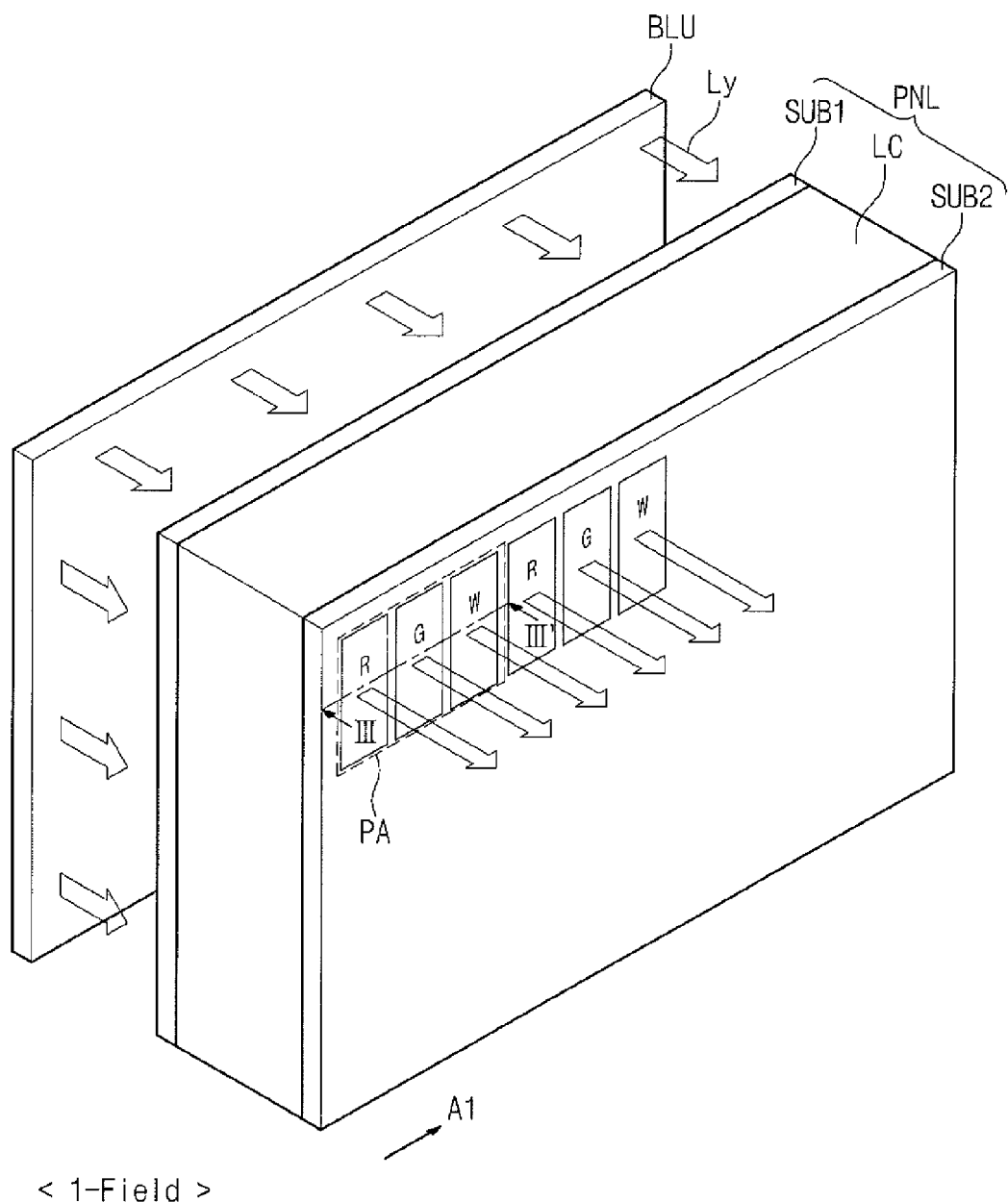
FIGS. 9A and 9B are perspective views showing an exemplary embodiment of a principle of realizing a full color image using time and space division schemes according to the invention.
Figure 9B:
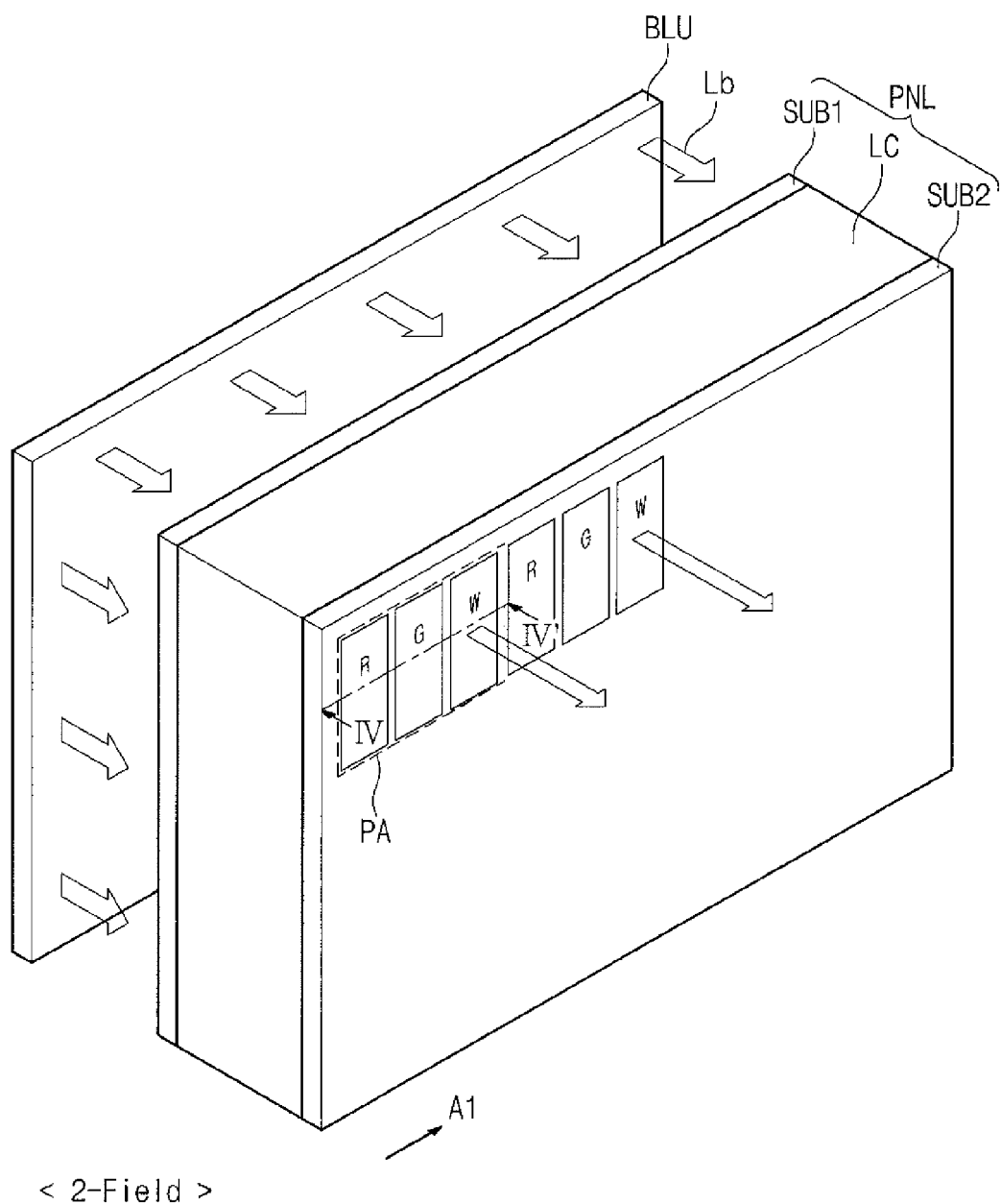

FIGS. 9A and 9B are perspective views showing a principle of realizing a full color image using time and space division schemes according to an exemplary embodiment of the invention, FIG. 10A is a cross-sectional view taken along line III-III' shown in FIG. 9A, and FIG. 10B is a cross-sectional view taken along line IV-IV' shown in FIG. 9B. In detail, FIGS. 9A and 10A show an operation mode of the first sub-field of the frame and FIGS. 9B and 10B show an operation mode of the second sub-field of the frame.

In the illustrated exemplary embodiment, the operation mode of the display panel PNL and the backlight unit BLU is changed every first and second sub-fields 1-Field and 2-Field, but the structure of the display panel PNL and the backlight unit BLU is not changed. Hereinafter, the structure of the display panel PNL and the backlight unit BLU will be described with reference to FIGS. 9A and 10A.

Referring to FIGS. 9A and 10A, the display panel PNL includes the red and green color filters R and G repeatedly arranged in the first direction A1.

In detail, the display panel PNL includes a first substrate SUB1, a second substrate SUB2 substantially in parallel to the first substrate SUB1, and a liquid crystal layer LC interposed between the first substrate SUB1 and the second substrate SUB2.

Although not shown in figures, the first substrate SUB1 may be a lower substrate on which the TFT Tr (refer to FIG. 1) and a pixel electrode of the liquid crystal capacitor Clc of each pixel PX (refer to FIG. 1) are disposed. The second substrate SUB2 may be an upper substrate on which the two color filters R and G disposed in each pixel area PA corresponding to each pixel PX and a common electrode of the liquid crystal capacitor Clc are disposed.

As shown in FIG. 10A, for the convenience of explanation, the pixels disposed on the first substrate SUB1 and the common electrode disposed on the second substrate SUB2 are omitted.

Referring to FIG. 10A, the second substrate SUB2 includes a base substrate BS, the red and green color filters R and G disposed on the base substrate BS, a black matrix BM disposed along an edge of the red and green color filters R and G, and an overcoating layer OC covering the red and green color filters R and G and the black matrix BM.

The open portion W is provided on the base substrate BS to be adjacent to at least one side of the red and green color filters R and G.

The overcoating layer OC includes an organic insulating layer and covers the red and green color filters R and G and the open portion W. Accordingly, a step difference between the area in which the color filters are disposed and the area in which the open portion W is disposed is covered by the organic insulating layer having a substantially plane surface facing the color filters and the open portion W.

The backlight unit BLU is disposed at the rear side of the display panel PNL. The backlight unit BLU includes the first light source LS1 and the second light source LS2. The first light source LS1 emits the first color light Ly and the second light source LS2 emits the second color light Lb.

During the first sub-field 1-Field, the first light source LS1 is driven to emit the first color light Ly, but the second light source LS2 is turned off.

Although not shown in figures, in an exemplary embodiment, each pixel includes a red sub-pixel disposed corresponding to the red color filter R, a green sub-pixel disposed corresponding to the green color filter G, and a white sub-pixel disposed corresponding to the open portion W. The white sub-pixel transmits the light passing through the open portion W, but the white sub-pixel does not display the white color. Each of the red, green, and white sub-pixels includes the TFT and the liquid crystal capacitor to be independently operated.

The red, green, and white sub-pixels are operated in the first sub-field 1-Field. Thus, the first color light Ly emitted from the first light source LS1 passes through the red and green color filters R and G and the open portion W, and then is displayed as the red and green images.

Referring to FIGS. 9B and 10B, during the second sub-field 2-Field, the second light source LS2 is driven to emit the second color light Lb, but the first light source LS1 is turned off.

In addition, the red and green sub-pixels are not operated in the second sub-field 2-Field, but the white sub-pixel is operated in the second sub-field 2-Field. Accordingly, when the second color light Lb is a blue color light, the second color light Lb emitted from the second light source LS2 does not pass through the red and green color filters R and G, but passes through the open portion W, thereby displaying the blue image, for example.

As described above, since the display apparatus according to the illustrated exemplary embodiment realizes the full color image, the display quality and the response speed of the display apparatus are improved.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a display panel which includes a plurality of pixels configured to display an image in a front direction; and
   a backlight unit configured to provide a light to the display panel and comprising:
   a first light source part which is disposed at a rear surface of the display panel, includes a first support substrate, and a first light source mounted on the first support substrate, and is configured to emit a first color light; and
   a second light source part which is disposed at the rear surface of the display panel, includes a second support substrate partially overlapped with the first support substrate when viewed in a plan view, and a second light source mounted on the second support substrate, and is configured to emit a second color light having a wavelength band different from a wavelength band of the first color light, wherein an opening is defined through the second support substrate and corresponds to the first light source, and the first light source is inserted into the opening.

2. The display apparatus of claim 1, wherein the first and second support substrates comprise first and second line parts disposed therein, respectively.

3. The display apparatus of claim 2, wherein at least one of the first and second support substrates is flexible.

4. The display apparatus of claim 2, wherein the first and second light sources are each configured to be independently driven.

5. The display apparatus of claim 4, wherein the first line part is configured to apply a power to the first light source, and the second line part is configured to apply a power to the second light source.

6. The display apparatus of claim 1, wherein each of the first and second light sources is provided in a plural number.

7. The display apparatus of claim 1, wherein the first light source part further includes a support member disposed between the first support substrate and the first light source.

8. The display apparatus of claim 7, wherein the support member has a thickness substantially the same as a thickness of the second support substrate.

9. The display apparatus of claim 1, wherein the first light source part further includes a light conversion part disposed on the first light source, and the light conversion part absorbs the first color light emitted from the first light source and is configured to convert the first color light to a third color light.

10. The display apparatus of claim 9, wherein the light conversion part comprises at least one of a fluorescent substance and a quantum dot which absorbs the first color light and emits the third color light.

11. The display apparatus of claim 1, wherein each of the plurality of pixels comprises a first color filter, a second color filter having a color different from that of the first color filter, and an open portion is defined in an area which is separated from and adjacent to the first and second color filters, the display panel displays the image in a unit of a frame, and the first and second light sources supply the first and second color lights to the display panel during first and second sub-fields defined by dividing the frame according to a time sequence, respectively.

12. The display apparatus of claim 11, wherein each of the plurality of pixels further comprises a first sub-pixel corresponding to the first color filter, a second sub-pixel corresponding to the second color filter, and a third sub-pixel corresponding to the open portion, and the first to third sub-pixels are each independently driven.

13. The display apparatus of claim 12, wherein the first to third sub-pixels are configured to receive the first color light during the first sub-field and display the image, and the third sub-pixel is configured to receive the second color light during the second sub-field and display the image.

14. The display apparatus of claim 12, wherein the first color light is a yellow color light and the second color light is a blue color light.

15. The display apparatus of claim 12, wherein the first and second color filters comprise a red color filter having a red color and a green color filter having a green color, respectively.

16. A backlight unit comprising:

a first light source part which includes a first support substrate, and a first light source disposed on the first support substrate configured to emit a first color light; and a second light source part which includes a second support substrate partially overlapped with the first support substrate when viewed in a plan view, and a second light source disposed on the second support substrate to emit a second color light having a wavelength band different from a wavelength band of the first color light, wherein an opening is defined through the second support substrate and corresponds to the first light source, and the first light source is inserted into the opening.

17. The backlight unit of claim 16, wherein the first and second light sources are each configured to be independently operated.

18. The backlight unit of claim 17, wherein the first color light is a yellow color light and the second color light is a blue color light.

19. The backlight unit of claim 16, wherein the first light source part further includes a support member disposed between the first support substrate and the first light source.

20. The backlight unit of claim 16, wherein the first light source part further includes a light conversion part disposed on the first light source, and the light conversion part absorbs the first color light emitted from the first light source and is configured to convert the first color light to a third color light.

* * * * *